United States Patent
Lee et al.

(10) Patent No.: US 12,267,133 B2
(45) Date of Patent: *Apr. 1, 2025

(54) OPERATION METHOD OF UE RELATED TO SIDELINK CSI REPORT IN WIRELESS COMMUNICATION SYSTEM

(71) Applicant: LG Electronics Inc., Seoul (KR)

(72) Inventors: Seungmin Lee, Seoul (KR); Uihyun Hong, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,111

(22) Filed: Sep. 5, 2023

(65) Prior Publication Data
US 2023/0421227 A1 Dec. 28, 2023

Related U.S. Application Data

(63) Continuation of application No. 17/859,685, filed on Jul. 7, 2022, now Pat. No. 11,777,579, which is a
(Continued)

(30) Foreign Application Priority Data

Jan. 30, 2020 (KR) .................. 10-2020-0010767
Feb. 13, 2020 (KR) .................. 10-2020-0017961

(51) Int. Cl.
*H04B 7/06* (2006.01)
*H04L 1/00* (2006.01)
*H04W 4/40* (2018.01)

(52) U.S. Cl.
CPC ......... *H04B 7/0626* (2013.01); *H04L 1/0003* (2013.01); *H04W 4/40* (2018.02)

(58) Field of Classification Search
CPC .... H04B 7/0626; H04B 7/063; H04B 7/0632; H04L 1/0003; H04L 1/0009;
(Continued)

(56) References Cited

U.S. PATENT DOCUMENTS

2016/0294593 A1* 10/2016 Yi ...................... H04L 27/2602
2018/0323900 A1 11/2018 Gulati et al.
(Continued)

FOREIGN PATENT DOCUMENTS

CN 109644455 A 4/2019
CN 110034906 A 7/2019
(Continued)

OTHER PUBLICATIONS

Apple, "On NR V2X Physical Layer Structure," 3GPP TSG RAN WG1 #99, R1-1912810, Reno, USA, Nov. 18-22, 2019, 15 pages.
(Continued)

*Primary Examiner* — John D Blanton
(74) *Attorney, Agent, or Firm* — Fish & Richardson P.C.

(57) ABSTRACT

Provided in some implementations is a sidelink-related operation method of a first user equipment (UE) in a wireless communication system, including the steps in which: a first UE receives, from a second UE, a physical sidelink control channel (PSCCH) including modulation coding scheme (MCS) information; a channel status information reference signal (CSI-RS) and a physical sidelink shared channel (PSSCH) related to the PSCCH are received; CSI is derived on the basis of the CSI-RS; and the first UE transmits, to the second UE, a CSI report including the CSI, wherein the CSI is derived on the basis of the determination of an MCS table.

17 Claims, 18 Drawing Sheets

Related U.S. Application Data continuation of application No. PCT/KR2021/001304, filed on Feb. 1, 2021.

(60) Provisional application No. 62/976,362, filed on Feb. 14, 2020.

(58) Field of Classification Search
CPC ... H04L 1/0016; H04L 1/0026; H04L 1/1664; H04L 1/1671; H04L 1/1854; H04L 1/1861; H04L 1/1896; H04L 5/001; H04L 5/005; H04L 5/0057; H04L 5/0053; H04W 4/40; H04W 4/025; H04W 48/12; H04W 92/18; H04W 72/20
See application file for complete search history.

(56) References Cited

U.S. PATENT DOCUMENTS

| | | | |
|---|---|---|---|
| 2019/0207662 A1 | 7/2019 | Zhou et al. | |
| 2019/0222462 A1* | 7/2019 | Nammi | H04L 1/0016 |
| 2019/0246421 A1 | 8/2019 | Zhou et al. | |
| 2019/0253121 A1* | 8/2019 | Islam | H04W 72/21 |
| 2020/0022089 A1 | 1/2020 | Guo | |

FOREIGN PATENT DOCUMENTS

| | | |
|---|---|---|
| CN | 110140408 A | 8/2019 |
| CN | 110249561 A | 9/2019 |
| CN | 110463066 A | 11/2019 |
| JP | 2019-522423 | 8/2019 |

OTHER PUBLICATIONS

Catt, "Initial discussion on RRM impact for NR V2X, " 3GPP TSG-RAN4#92 Meeting, R4-1908405, Ljubljana, Slovenia, Aug. 26-30, 2019, 2 pages.

Futurewei, "Remaining details on physical layer structure for the sidelink," 3GPP TSG RAN WGI Meeting #99, R1-1912428, Reno, USA, Nov. 18-22, 2019, 10 pages.

Intel Corporation, "Sidelink physical structure for NR V2X communication," 3GPP TSG RAN WGI Meeting #99, R1-1913255, revised R1-1912203, Reno, Nevada, USA, Nov. 18-22, 2019, 35 pages.

InterDigital, Inc., "Physical Layer Structure for NR V2X Sidelink," 3GPP TSG RAN WG1 #99, R1-1913274, Reno, U.S.A, Nov. 18-22, 2019, 17 pages.

LG Electronics, "Discussion on in-device coexistence between LTE and NR sidelinks, " 3GPP TSG RAN WG1 #97, R1-1907017, Reno, USA, May 13-17, 2019, 2 pages.

NEC, "Physical layer structure for NR sidelink," 3GPP TSG RAN WG1 #99, R1-1912615, Reno, USA, Nov. 18-22, 2019, 9 pages.

Notice of Allowance in Korean Appln. No. 10-2022-7022062, mailed on Oct. 17, 2023, 4 pages (with English translation).

NTT Docomo, Inc., "Sidelink physical layer structure for NR V2X," 3GPP TSG RAN WG1 #99, R1-1912880, Reno, US, Nov. 18-22, 2019, 16 pages.

Office Action in Japanese Appln. No. 2022-545845, mailed on Oct. 3, 2023, 9 pages (with English translation).

Office Action in Chinese Application No. 202180011632.6, mailed on Jun. 29, 2024, 16 pages (with English Translation).

Notice of Allowance in Chinese Appln. No. 202180011632.6, mailed on Dec. 4, 2024, 6 pages (with English translation).

Samsung, "NR UE performance Ad-hoc miniutes," R4-1809347, 3GPP TSG-RAN WG4, Meeting, Jul. 2018, Ad-hoc, Montreal, Canada, May 21-25, 2018, 34 pages.

\* cited by examiner

OPERATION METHOD OF UE RELATED TO SIDELINK CSI REPORT IN WIRELESS COMMUNICATION SYSTEM

CROSS-REFERENCE TO RELATED APPLICATIONS

This application is a continuation of U.S. application Ser. No. 17/859,685, filed on Jul. 7, 2022, which is a continuation of International Application No. PCT/KR2021/001304, filed on Feb. 1, 2021, which claims the benefit of U.S. Provisional Application No. 62/976,362, filed on Feb. 14, 2020, Korean Application No. 10-2020-0017961, filed on Feb. 13, 2020, and Korean Application No. 10-2020-0010767, filed on Jan. 30, 2020. The disclosures of the prior applications are hereby incorporated by reference herein in their entirety.

TECHNICAL FIELD

The following description relates to a wireless communication system, and more particularly to an operation method and apparatus related to sidelink channel status information (CSI) report.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

An object of embodiment(s) is methods related to CSI report in sidelink.

According to an embodiment, a sidelink-related operation method of a first user equipment (UE) in a wireless communication system includes receiving a physical sidelink control channel (PSCCH) including modulation coding scheme (MCS) information from a second UE by the first UE, receiving a channel status information reference signal (CSI-RS) and a physical sidelink shared channel (PSSCH) related to the PSCCH, deriving CSI information based on the CSI-RS, and transmitting CSI report including the CSI information to the second UE by the first UE, wherein the CSI information is derived based on determination of a MCS table.

According to an embodiment, a first user equipment (UE) in a wireless communication system includes at least one processor, and at least one computer memory operatively connected to the at least one processor and configured to store commands for allowing the at least one processor to perform operations when being executed, wherein the operations includes receiving a physical sidelink control channel (PSCCH) including modulation coding scheme (MCS) information from a second UE, receiving a channel status information reference signal (CSI-RS) and a physical sidelink shared channel (PSSCH) related to the PSCCH, deriving CSI information based on the CSI-RS, and transmitting CSI report including the CSI information to the second UE, and wherein the CSI information is derived based on determination of a MCS table.

An embodiment provides a processor for performing operations for a first user equipment (UE) in a wireless communication system, the operations including receiving a physical sidelink control channel (PSCCH) including modulation coding scheme (MCS) information from a second UE, receiving a channel status information reference signal (CSI-RS) and a physical sidelink shared channel (PSSCH) related to the PSCCH, deriving CSI information based on the CSI-RS, and transmitting CSI report including the CSI information to the second UE, wherein the CSI information is derived based on determination of a MCS table.

An embodiment provides a non-volatile computer-readable storage medium for storing at least one computer program including a command for allowing at least one processor to perform operations for a first user equipment (UE) when being executed by at least one processor, the operations including receiving a physical sidelink control channel (PSCCH) including modulation coding scheme (MCS) information from a second UE, receiving a channel status information reference signal (CSI-RS) and a physical sidelink shared channel (PSSCH) related to the PSCCH, deriving CSI information based on the CSI-RS, and transmitting CSI report including the CSI information to the second UE, wherein the CSI information is derived based on determination of a MCS table.

The CSI information may include channel quality information (CQI) and a rank indicator (RI), and the CQI may be derived based on determination of the MCS table.

The CSI information may be derived based on a CQI table related with the MCS table.

When one or more sidelink transmissions including transmission of the CSI report overlaps with a plurality of UL transmissions, only if at least one sidelink transmission takes precedence over all the plurality of UL transmissions, sidelink transmission is performed.

The MCS table may be configured for each resource pool.

The UE may deactivate a sidelink bandwidth part (BWP) of which at least one of an RB boundary with an uplink BWP or a DC location is not aligned.

The first UE may communicate with at least one of another UE, a UE related to an autonomous driving vehicle, a base station (BS), or a network.

According to an embodiment, a reference CQI table for CSI report may be flexibly changed without overhead. A UE that performs UL TX and SL TX may select a link for effective transmission. In addition, in terms of a UE that simultaneously performs UL/SL, an SL BWP may be effectively used only when there is no switching delay between an SL BWP and a UL BWP.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
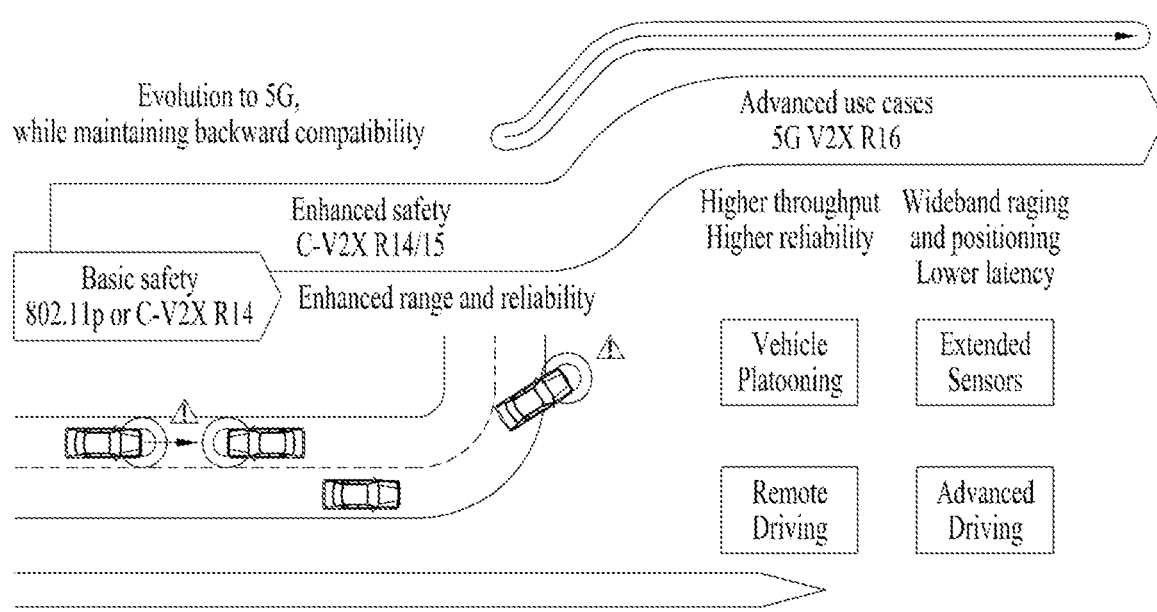
FIG. 1 is a diagram comparing vehicle-to-everything (V2X) communication based on pre-new radio access technology (pre-NR) with V2X communication based on NR.
Figure 2:
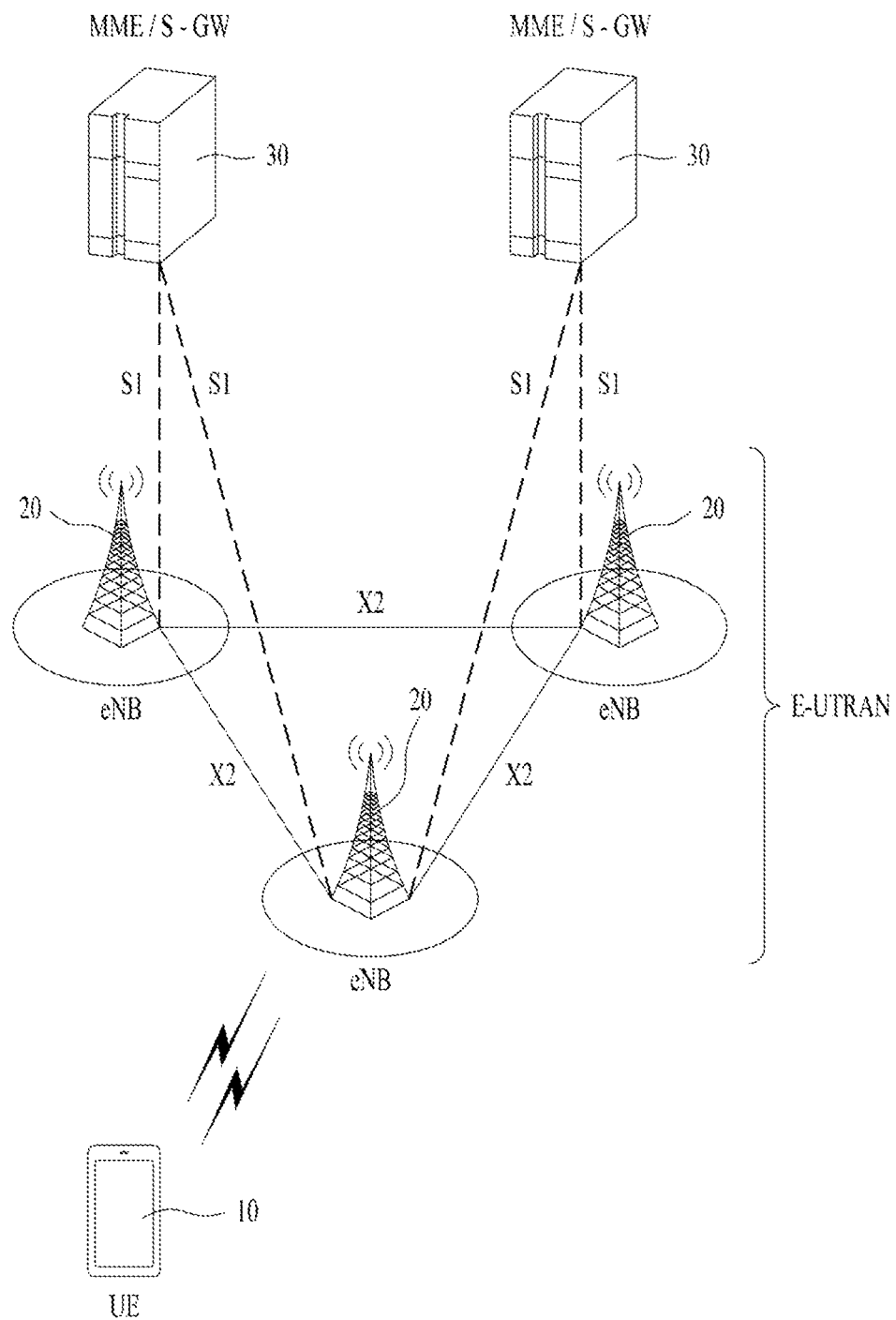
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figures 3A, 3B:
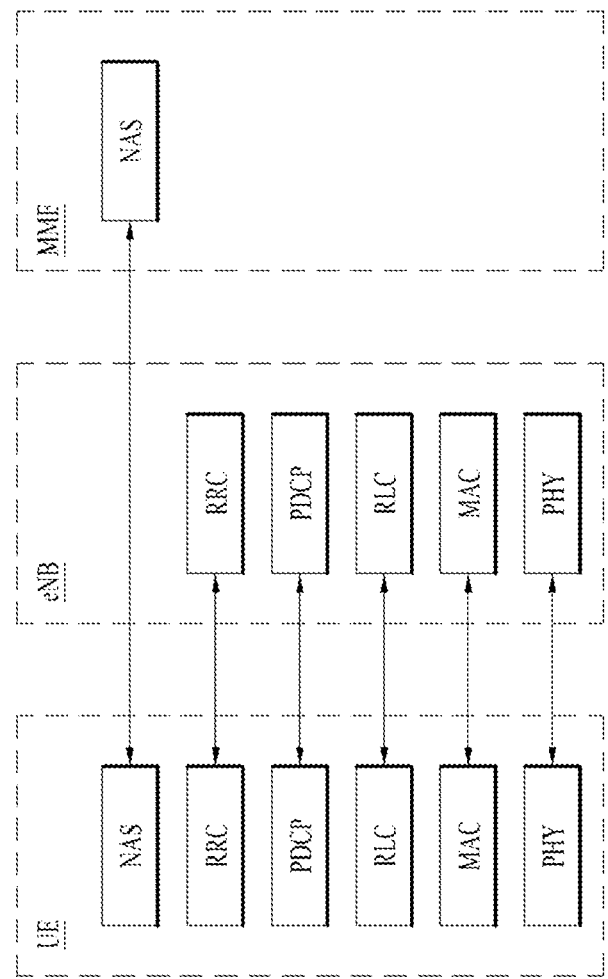
FIGS. 3A and 3B are diagrams illustrating user-plane and control-plane radio protocol architectures according to an embodiment of the present disclosure.

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and 3B, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB).

The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
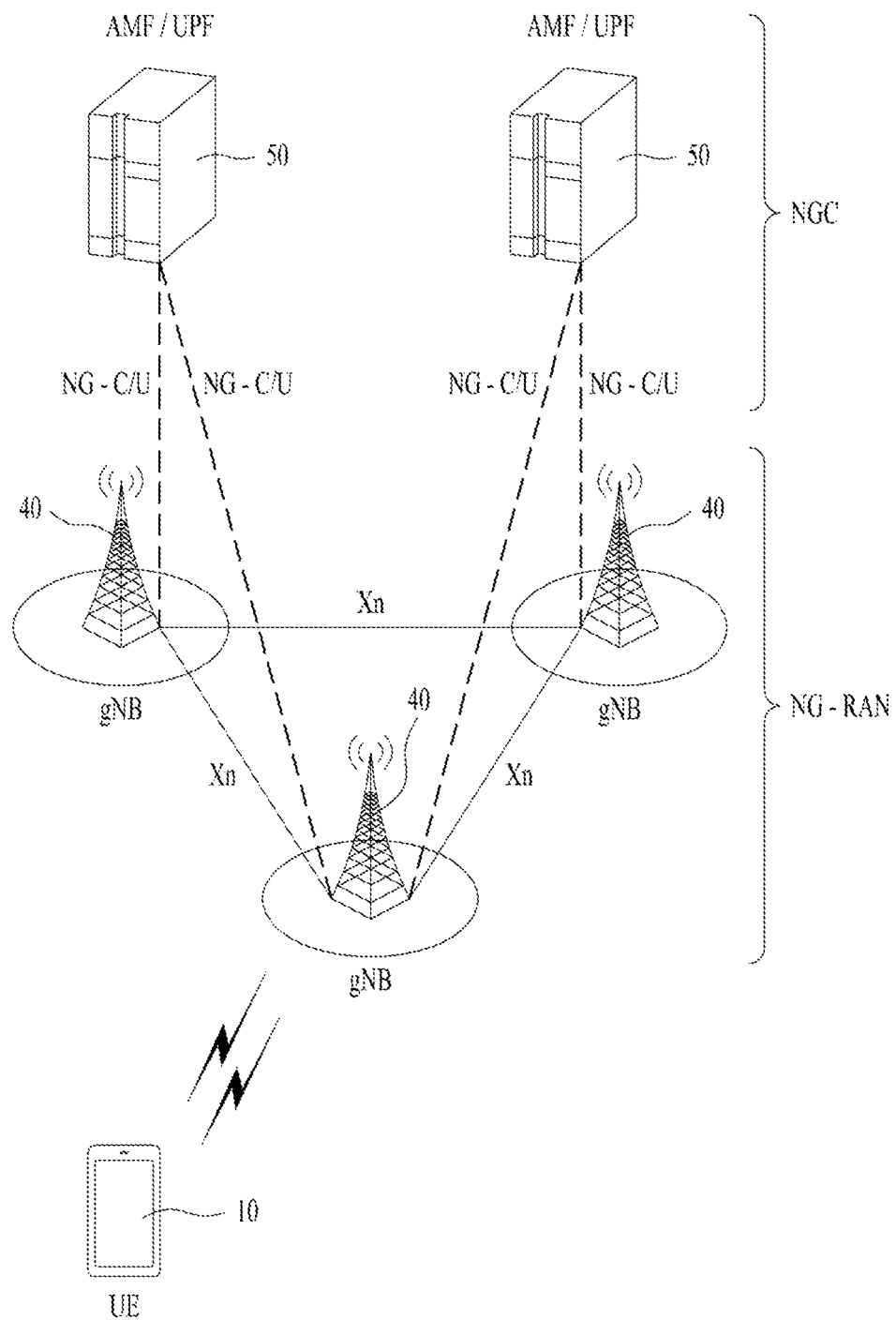
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
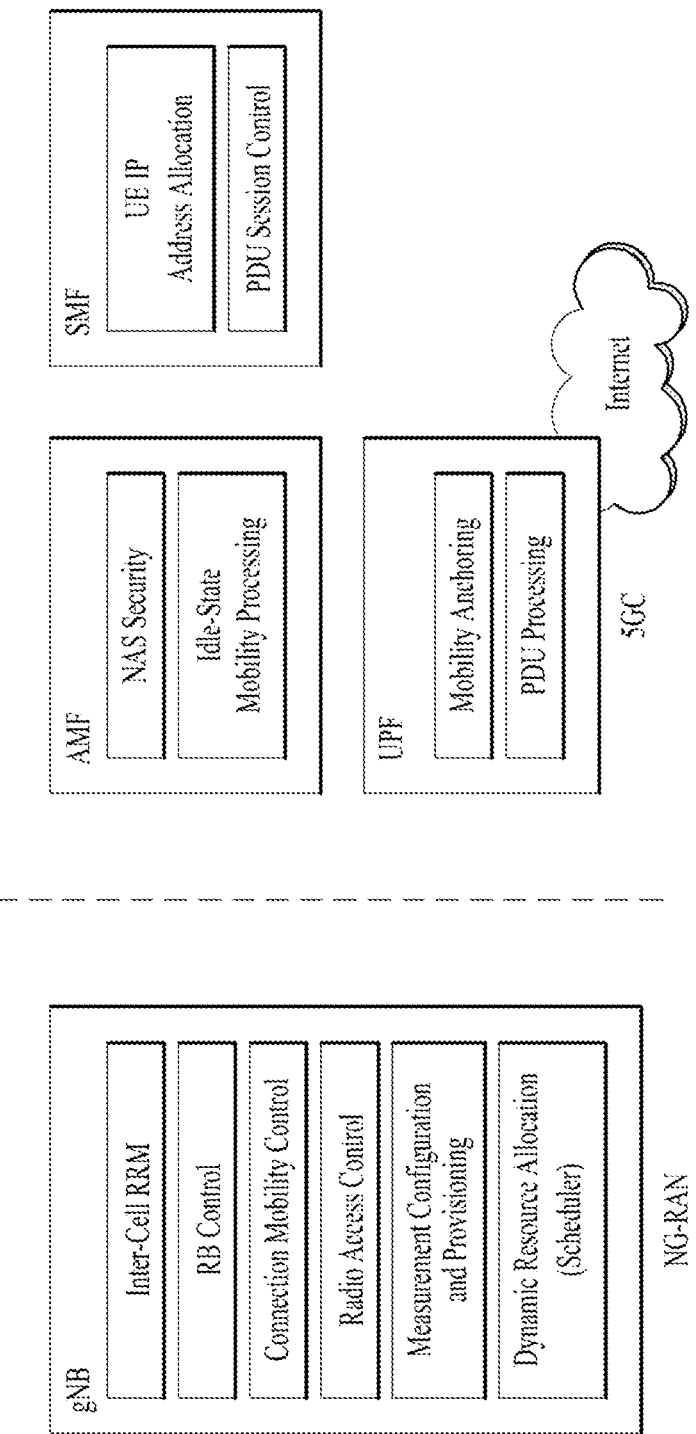
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
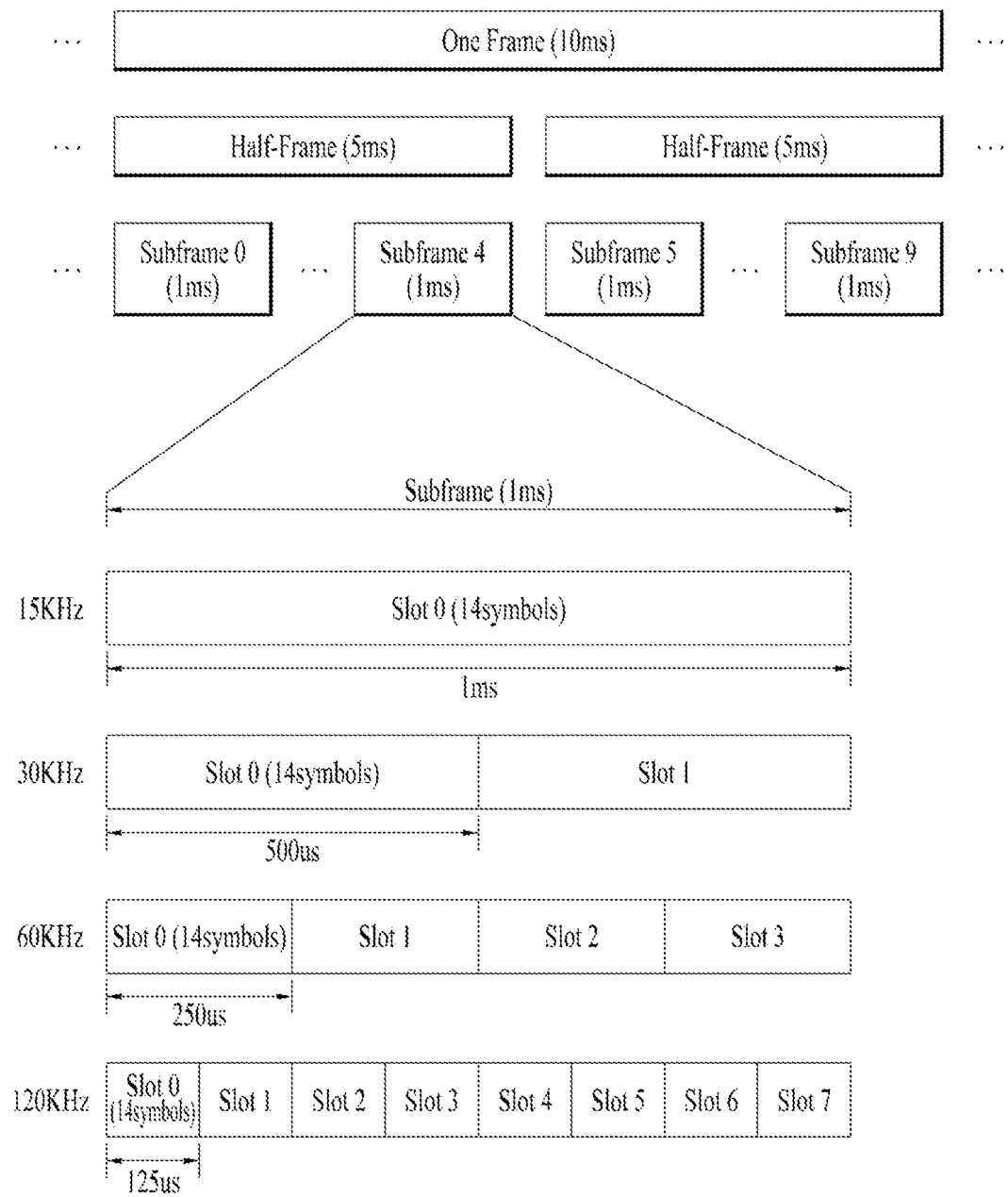
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 110 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration p in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in Table 3. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in Table 4. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
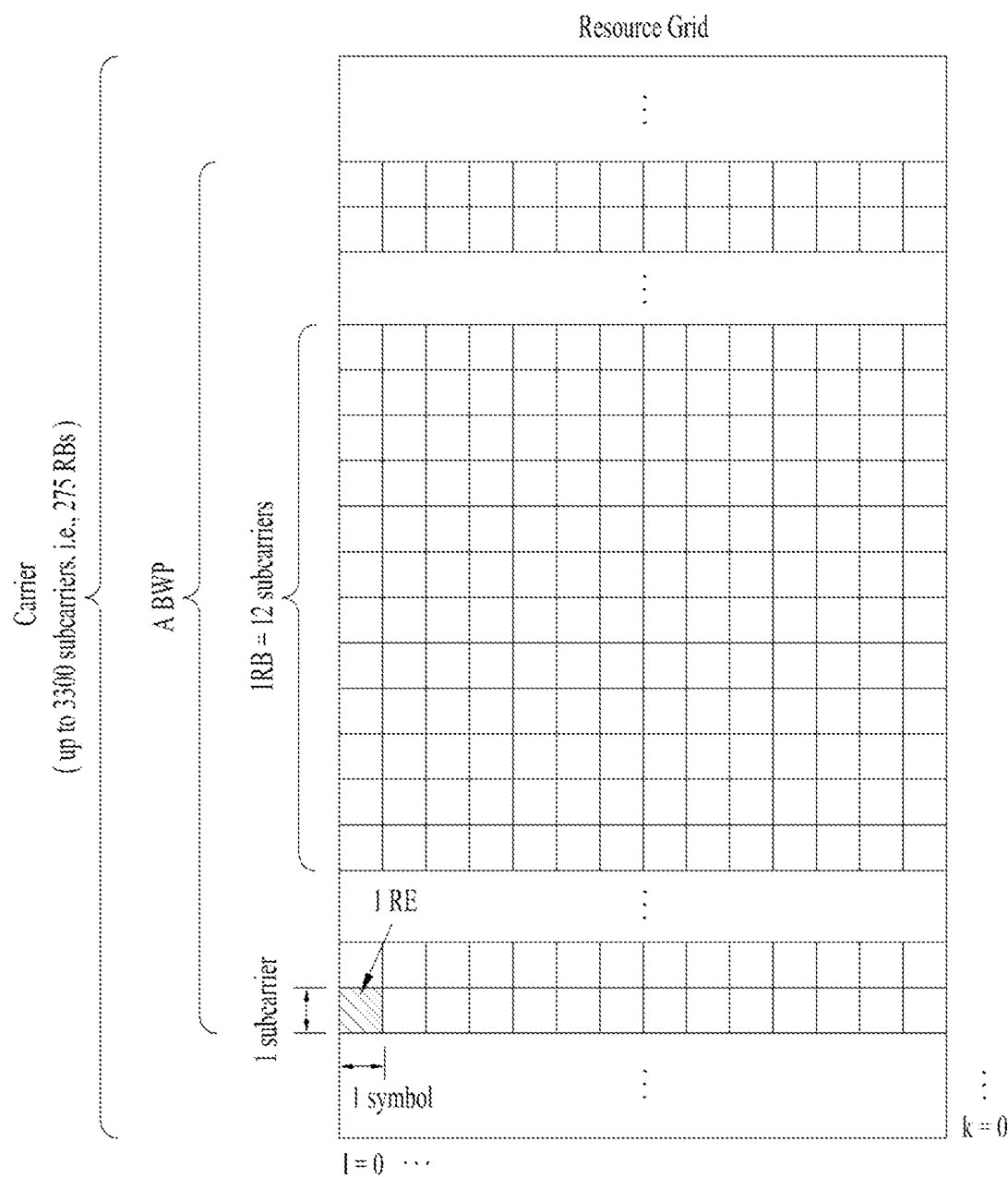
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8A:
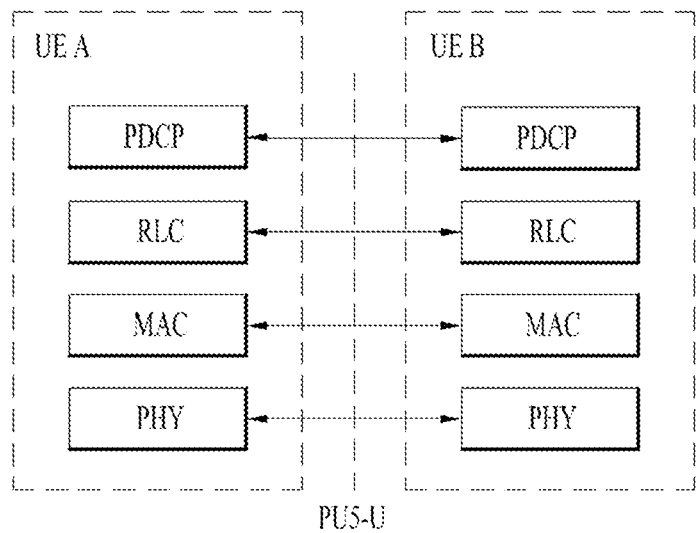
FIGS. 8A and 8B are diagrams illustrating radio protocol architectures for sidelink (SL) communication according to an embodiment of the present disclosure.
Figure 8B:
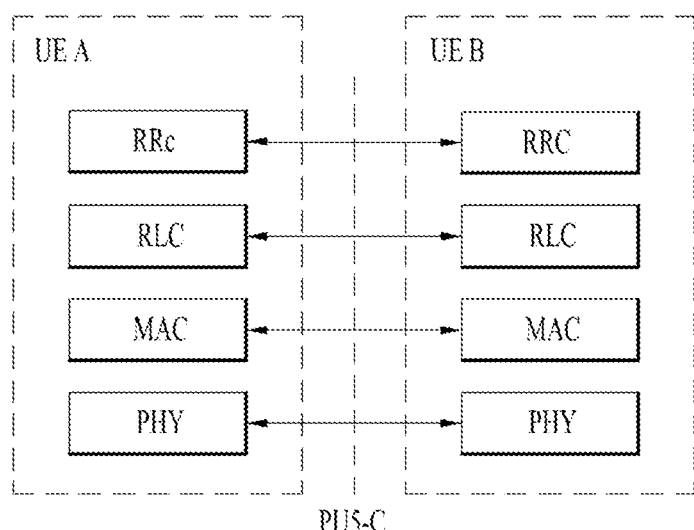

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
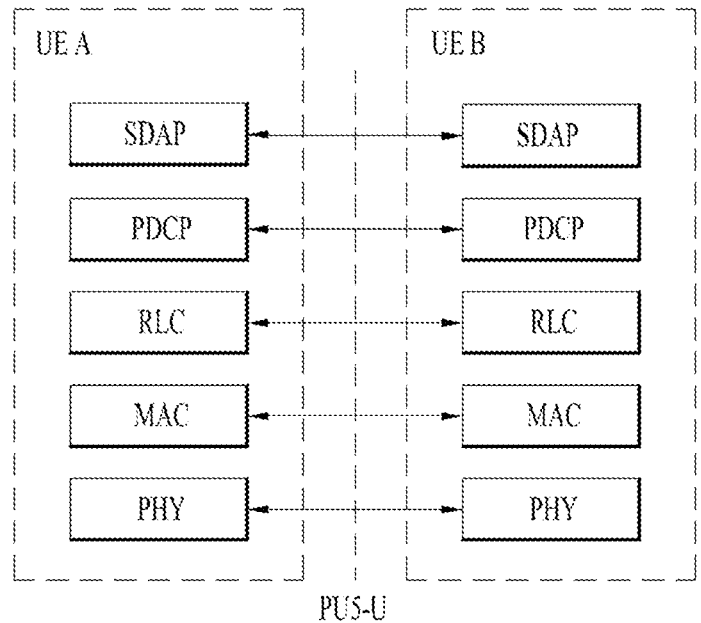
FIGS. 9A and 9B are diagrams illustrating radio protocol architectures for SL communication according to an embodiment of the present disclosure.
Figure 9B:
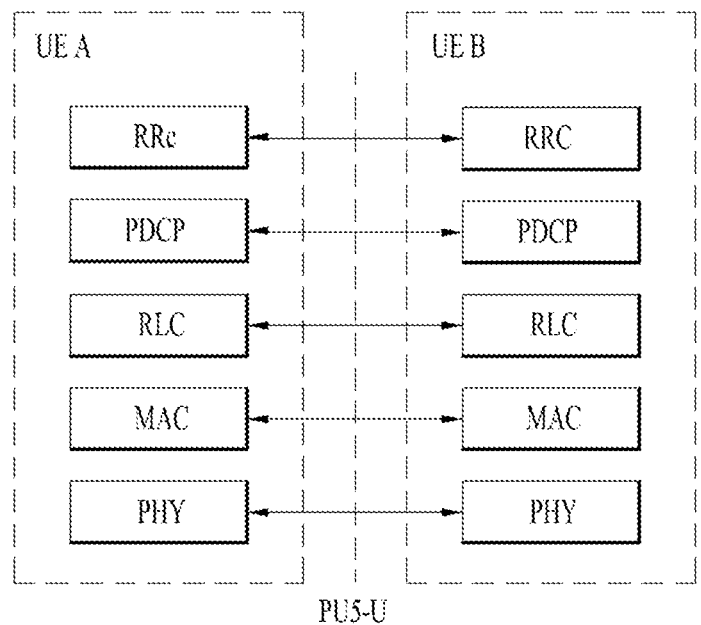

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR.

Resource allocation in SL will be described below.

Figure 10A:
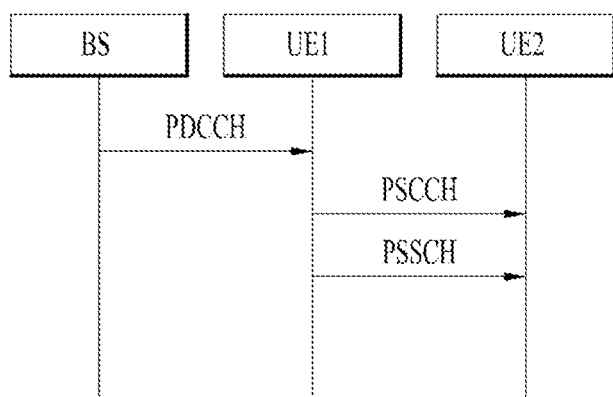
FIGS. 10A and 10B illustrate a procedure of performing V2X or SL communication according to a transmission mode in a UE according to an embodiment of the present disclosure.
Figure 10B:
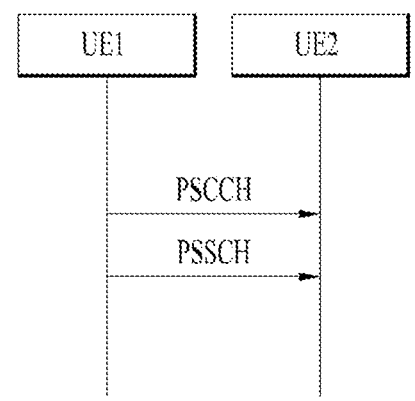

FIGS. 10A and 10B illustrate a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10A illustrates a UE operation related to LTE transmission mode 1 or LTE transmission mode 3. Alternatively, for example, FIG. 10A illustrates a UE operation related to NR resource allocation mode 1. For example, LTE transmission mode 1 may be applied to general SL communication, and LTE transmission mode 3 may be applied to V2X communication.

For example, FIG. 10B illustrates a UE operation related to LTE transmission mode 2 or LTE transmission mode 4. Alternatively, for example, FIG. 10B illustrates a UE operation related to NR resource allocation mode 2.

Referring to FIG. 10A, in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10B, in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI related with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or
  an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
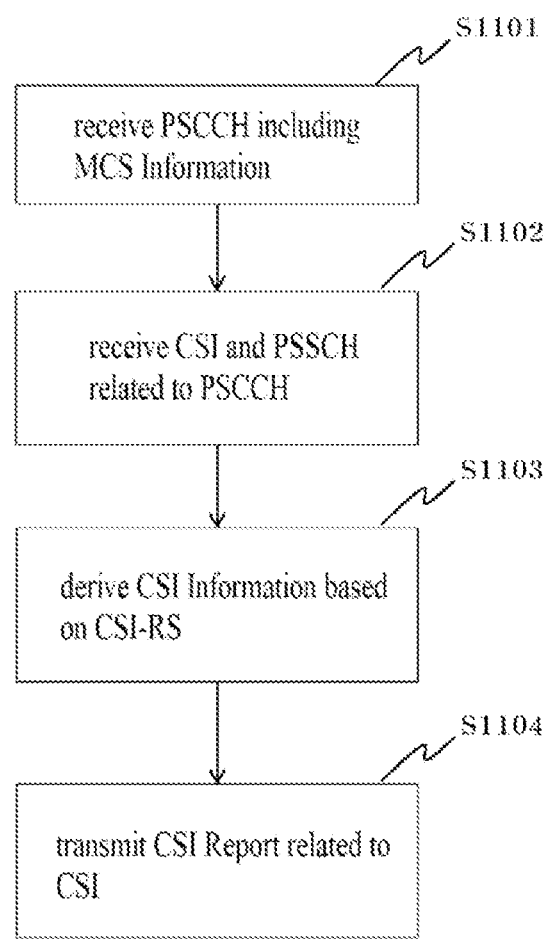
FIG. 11 is a diagram for explaining embodiment(s)

A first UE may receive a physical sidelink control channel (PSCCH) including modulation coding scheme (MCS) information from a second UE (S1101 of FIG. 11). The PSCCH may include information related to the aforementioned SCI in addition to the MCS information. The first UE may receive a physical sidelink shared channel (PSSCH) related to the PSCCH and a channel status information reference signal (CSI-RS) (S1102 of FIG. 11). CSI information may be derived based on the CSI-RS (S1103 of FIG. 11). The first UE may perform measurement based on the CSI-RS and may derive CQI, PMI, or the like. Then, CSI report including the CSI information may be transmitted to the second UE (S1104 of FIG. 11).

Here, the CSI information may be derived based on determination of the MCS table. The CSI information may include channel quality information (CQI) and a rank indicator (RI), and the CQI may be derived based on determination of the MCS table. That is, SL CSI information derivation may be configured to be performed based on the MCS table used in the PSCCH/PSSCH related to SL CSI reporting. That is, a reference CQI table corresponding to CSI report may be configured to be related with the MCS table indicated by SCI for triggering the CSI report. That is, the CSI information may be derived based on the CQI table related with the MCS table. The CSI-RS may be transmitted on the associated PSSCH when a 'CSI REQUEST' field included in 2ND SCI (transmitted on the PSSCH) is set to 1.

In detail, for example, when an MCS table determined/selected/used based on the MCS information is an MCS table #1, in conjunction with this, the CQI table may be determined as a CSI table #1, and the first UE may derive CQI based on the CQI table. When an MCS table determined/selected/used based on the MCS information is an MCS #2, in conjunction with this, the CQI table may be determined as a CSI table #3. The MCS table and the CQI table may be a table exemplified in 3GPP TS 38.213 or differently therefrom, may be configured, and an embodiment is not limited to a detailed table.

Hereinafter, various examples related to the aforementioned MCS table will be described. The following description may be applied/used with the example or used independently without conflicting with the description above.

When a plurality of MCS tables (e.g., 64QAM MCS table, 256QAM MCS table, or LOW-SPECTRAL EFFICIENCY 64QAM MCS table) is configured resource pool-specifically, the tables may be configured to comply with the following rule.

Cast type-specifically (e.g., unicast, groupcast, broadcast) (and/or a service type/priority and/or service QOS requirements (e.g., reliability)), an MCS table to be selected/used (to transmit a PSSCH (and/or to derive SL CSI information)) may be limited. For example, in the case of broadcast (and/or groupcast), it may be difficult to effectively adapt a TX parameter based on link quality between RX UE(s) and a TX UE (and/or it may be difficult for the TX UE to determine whether the RX UE(S) have a 256QAM MCS table (and/or LOW-SPECTRAL EFFICIENCY 64QAM MCS table)-related reception capability), and thus (conservatively), only the 64QAM MCS table may be configured to be restrictedly used. In another example, in the case of unicast, information on whether there is transmission and/or reception capability based on a certain MCS table (and/or information on an MCS table on which SL CSI information (e.g., CQI or RI) is based) may be exchanged between a UE pair through PC5 RRC signaling. Here, for example, when a corresponding rule is applied, if it is possible to support UE capability in unicast, some (e.g., subset) of a plurality of MCS tables configured resource pool-specifically may be freely selected/used for SL communication (between a UE pair). In another example, SL CSI information derivation may also be configured to be performed based on an MCS table (and/or an MCS table configured for the corresponding use in advance (resource-pool (and/or service type/priority and/or service QOS requirement)-specifically)) used in the PSCCH/PSSCH (e.g., which is interpreted as a type of SL CSI reference resource) on which SL CSI reporting is triggered.

Continuously, when one or more sidelink transmissions including transmission of the CSI report overlaps with a plurality of UL transmissions, sidelink transmission may be performed only when at least one sidelink transmission takes precedence over all the plurality of UL transmissions. That is, when a plurality of SL TXs overlap with a plurality of UL TXs, if at least one SL TX (or UL TX) has a higher priority than the plurality of UL TXs (or SL TXs), SL TX (or UL TX)

may be performed. When some (or all) information is multiplexed and transmitted on the PUSCH, a PUSCH-related priority used to compare with an SL TX-related priority may be assumed to be the highest priority from UL-related information.

The UE may deactivate a sidelink bandwidth part (BWP) of which at least one of an RB boundary with at least one of UL BWP or a DC location is not aligned. That is, when an RB boundary between a UL BWP and a SL BWP is not aligned, the UE may deactivate the SL BWP.

A method of handling mismatch between SL BWP DC and Uu BWP DC may be to overcome a problem such as RF switching delay. In more detail, in an NR sidelink communication environment, a bandwidth part (BWP) of Uu link and a BWP of sidelink (hereinafter referred to as a Uu BWP and an SL BWP) may be separately configured. In this case, the direct current (DC) location of the Uu BWP and the DC location of the SL BWP may be different according to a method of configuring the Uu BWP and the SL BWP. In the above description, the DC may refer to a center of a UE RF bandwidth. When the DC location of the Uu BWP and the DC location of the SL BWP are different, there may be a problem such as RF switching delay.

In this regard, in order to prevent RF switching delay, it may be assumed that the SL BWP DC and the Uu BWP DC have the same locations. When (as described above) the SL BWP DC and the Uu BWP DC of the UE have the same location, RF bandwidth sizes of the SL BWP and the Uu BWP may be the same or different. In this case, in (the same or different) RF bandwidths, the SL BWP and the Uu BWP may be configured in different locations. When the RF bandwidth and the DC location of the Uu BWP are determined, if the RF bandwidth center of the SL BWP is configured to be different from the configured Uu BWP DC location, the UE may deactivate the SL BWP.

In an NR Uu communication environment, the location of a DC sub-carrier of the UL BWP or whether to shift sub-carriers of both sides by 7.5 kHz based on a DC sub-carrier (or whether to shift the center of the DC sub-carrier by 7.5 kHz) may be configured by a BS/network. In addition, in an SL BWP, a preconfigured location of the DC sub-carrier or whether to shift sub-carriers of both sides by 7.5 kHz based on a DC sub-carrier (or whether to shift the center of the DC sub-carrier by 7.5 kHz) may also be configured by a BS/network. For example, in the case of the SL BWP (or UL BWP), exceptionally, the aforementioned sub-carrier shifting offset value may be defined to be assumed/considered to be a half of SCS related to the SL BWP (or the UL BWP). In this case, SCS as a reference of the sub-carrier shifting offset value of the SL BWP may be independently (or dependently) configured from the SCS as a reference of the sub-carrier shifting offset value of the UL BWP. In the above description, the Uu BWP may be interpreted as the UL BWP (or the DL BWP).

Tables 5 to 7 below are contributions related to the present disclosure.

TABLE 5

1.1. Power control
For the power limited case in supporting simultaneous sidelink and uplink transmissions across different carriers, it is necessary to define priority rule between UL carrier and SL carrier. In NR, logical channel priority can be configured for UL channel(s) or SL channels. In this case, it would be natural to reuse it for priority rule for power control. According to RAN2 agreement made in RAN2#106 [1], it is agreed that "For NR UL and NR SL prioritization, MSG1/3 for RACH procedure and PUSCH for emergency PDU connection are always prioritized over SL transmission". For remaining UL or SL channels, it can be considered to follow LTE principle. In a similar manner, for the UL transmission whose priority is not defined in higher layers, LTE principle can be resued for the UL-SL prioritization to select one of them. To be specific, whether or not to allocate power for SL channel(s) is decided depending on priority indicated by SCI and higher layer parameter thresSL-TxPrioritizeation. In case of PSFCH, a UE could transmit more than one PSFCH in the same timing, it is necessary to define how to allocate each PSFCH power depending on the priority. For simplicity, it can be considered to decide whether sidelink transmissions are prioritized over uplink transmission according to the smallest priority value of sidelink transmissions, and then allocate power to the multiple PSFCH equally to ensure power of each PSFCH could be large enough considering EVM impairment and PSFCH coverage.

TABLE 6

Proposal 1: Power control for simultaneous transmission of sidelink and uplink across different carriers,
A UE determines a priority of PRACH or PUSCH scheduled by RAR UL grant is smaller than
the high layer parameter thresUL-TxPrioritization.
For PUCCH with HARQ-ACK information of downlink, and/or CSI and/or LRR or PUSCH
without UL-SCH or SRS, LTE principle is reused
A UE determines a priority of PUCCH with HARQ-ACK information of downlink,
and/or CSI and/or LRR or PUSCH without UL-SCH or SRS is greater than or equal to
the high layer parameter thresUL-TxPrioritization.
A priority of the HARQ-ACK information for sidelink on PUCCH or PUSCH is the same as the
priority of a corresponding PSFCH
A priority of the SR for sidelink on PUCCH is indicated by higher layers according to the
corresponding transport block.
If priority of uplink transmission except for PUCCH with HARQ-ACK information and/or SR
for sidelink (and/or SL BSR) is smaller than thresUL-TxPrioritization, or
if priority of PUCCH with HARQ-ACK information for sidelink is smaller than or equal to
priority of sidelink transmission, or
if priority of PUCCH with SR for sidelink is smaller than or equal to priority of sidelink
transmission
Uplink transmission is prioritized over sidelink transmission
Else

TABLE 6-continued

OPTION#1
If PUSCH contains HARQ-ACK information for sidelink (and/or SL BSR).
If priority of the SL transmission is smaller than the priority of the
HARQ-ACK information for sidelink (and/or SL BSR) on PUSCH
Sidelink transmission is prioritized over uplink transmission
Else
Uplink transmission is prioritized over sidelink transmission
Else
If priority of sidelink transmission is smaller than sl-PriorityThreshold,
Sidelink transmission is prioritized over uplink transmission
Else
Uplink transmission is prioritized over sidelink transmission
OPTION#2
If priority of sidelink transmission is smaller than sl-PriorityThreshold,
Sidelink transmission is prioritized over uplink transmission
Else
Uplink transmission is prioritized over sidelink transmission
For the case where multiple sidelink transmissions are overlapped with an uplink
transmission(s), the smallest priority value among the sidelink transmission is used for the
comparison.
For the case where multiple uplink transmissions are overlapped with a sidelink transmission(s),
the smallest priority value among the uplink transmission is used for the comparison.
Note: UL threshold and SL threshold are high layer parameters.

TABLE 7

Proposal 2: For dropping rule for simultaneous transmission of sidelink and uplink in a carrier,
For PUCCH with HARQ-ACK information of downlink, and/or CSI and/or LRR or PUSCH
without UL-SCH or SRS, LTE principle is reused (Here, as an example, the listed
channels/information may be interpreted as having no associated (LOGICAL CHANNEL)
priority).).
For the case where multiple sidelink transmissions are overlapped with an uplink
transmission, the smallest priority value among the sidelink transmission is used for the
comparison.
For the case where multiple uplink transmissions are overlapped with a sidelink
transmission, the smallest priority value among the uplink transmission is used for the
comparison.

In the above proposal (e.g., proposals 1 and/or 2), when piggybacked on SL HARQ feedback on the PUSCH (UL-SCH), a priority of the corresponding PUSCH may be configured (A) to be assumed to be a priority of (logical channel) of the UL-SCH, (B) to be assumed to be a priority of SL HARQ feedback (e.g., which is interpreted as a priority of a PSSCH related with the PSFCH or the highest priority when SL HARQ feedback to a plurality of TBs is transmitted through the PSFCH), or (C) to be assumed to be a priority of preconfigured UL (or SL). In another example, in the above proposal (e.g., proposal 1), when SL HARQ feedback is transmitted through the PUCCH, a priority of the corresponding PUCCH may be configured (A) to be assumed to be a priority of SL HARQ feedback (e.g., which is interpreted as a priority of the PSSCH related with the PSFCH or the highest priority when SL HARQ feedback to a plurality of TBs is transmitted through the PSFCH) or (B) to be assumed to be a preconfigured priority of UL (or SL).

In another example, in the proposal of the present disclosure (e.g., proposals 1 and/or 2), when the following some (or all) information is multiplexed and transmitted on the PUSCH, a PUSCH-related priority used to compare with an SL TX-related priority may be configured (A) to be assumed to be the highest priority of UL-related information, (B) to be assumed to be the highest priority of SL-related information, (C) to be assumed to be a higher priority from the highest priority of UL-related information and the highest priority of SL-related information, or (D) to be assumed to be a preconfigured priority. In another example, in this case, after UL-related information with the highest priority is compared with thresUL-TxPrioritization, when the highest priority of the UL-related information is higher than thresUL-TxPrioritization, corresponding PUSCH transmission may be performed (e.g., SL TX drop) (or power is preferentially allocated to PUSCH transmission), and otherwise, (A) when the SL TX-related priority is higher than sl-PriorityThreshold, SL TX may be performed (e.g., PUSCH TX drop) (or power is preferentially allocated to SL TX), and in contrast, when the SL TX-related priority is lower than sl-PriorityThreshold, PUSCH transmission may be performed (e.g., SL TX drop) (or power is preferentially allocated to PSUCH transmission). In another example, after UL-related information with the highest priority is compared with thresUL-TxPrioritization, when the highest priority of the UL-related information is higher than thresUL-TxPrioritization, corresponding PUSCH transmission may be performed (e.g., SL TX drop) (or power is preferentially allocated to PUSCH transmission), and otherwise, (A) when the highest priority of the SL-related information (PUSCH) is lower than the SL TX-related priority, SL TX may be performed (e.g., PUSCH TX drop) (or power is preferentially allocated to SL TX), and in contrast, when the highest priority of the SL-related information (PUSCH) is higher than the SL TX-related priority, PUSCH transmission may be performed (e.g., SL TX drop) (or power is preferentially allocated to PSUCH transmission). In another example, when the highest priority of the SL-related information (PUSCH) is lower than the SL TX-related priority, SL TX may be performed (e.g., PUSCH TX drop) (or power is preferentially allocated to SL TX), and in contrast, when the highest priority of the SL-related information (PUSCH) is higher than the SL TX-related priority, PUSCH transmission may be performed (e.g., SL TX drop) (or power is preferentially allocated to PSUCH transmission). In another example, when the SL TX-related priority is higher than sl-PriorityThreshold, SL TX may be performed (e.g., PUSCH TX drop) (or power is preferentially allocated to SL TX), and in contrast, when the SL TX-related priority is lower than sl-PriorityThreshold, PUSCH transmission may be performed (e.g., SL TX drop) (or power is preferentially allocated to PSUCH transmission). In another example, a comparison result of the SL TX-related priority may be information that is multiplexed and transmitted on the PUSCH, and TX dropping (or preferential allocation of power) based on the proposed rule may be independently applied/performed in information multiplexed and transmitted on the SL TX and the PUSCH.

SL HARQ A/N (e.g., a related priority may be considered as a logical channel priority of data on an associated PSSCH)

UL BSR

In another example, in the proposal (e.g., proposals 2 and/or 1), when transmission in which SL BSR is piggybacked on the PUSCH including the UL-SCH and SL TX transmission overlap on the time domain, a priority of the PUSCH may be (A) assumed to be a (logical channel) UL priority of the UL-SCH and to be compared with thresUL-TxPrioritization, or (B) assumed to be the highest priority between a UL-SCH (logical channel) priority and a SL BSR (logical channel) priority and to be compared with thresUL-TxPrioritization (or sl-PriorityThreshold), or assumed to be a preconfigured UL priority (or SL priority) and to be compared with thresUL-TxPrioritization (or sl-PriorityThreshold). Here, in another example, when SL BSR information on the PUSCH including the UL-SCH and SL HARQ feedback are fed back, a relatively high priority of the SL BSR and the SL HARQ feedback may be assumed to be SL information priority. In another example, in the above proposal (e.g., proposals 2 and/or 1), when the UL-SCH and the UL BSR are multiplexed on the PUSCH, a relatively high priority of the two priorities may be determined.

In another example, in the case of UL (or SL) channel transmission without associated (logical channel) priority, a related UL (or SL) priority may be preconfigured by a network/BS or may be configured by predefined signaling (e.g., PC5 RRC) between UEs.

Continuously, Tables 8 to 14 below may be contributions related to the present disclosure.

TABLE 8

For dual-connectivity, when NR SL transmission is overlapped with LTE-UL transmission, it can be considered that power is allocated to LTE-UL transmission first to minimize impact on the LTE system. In a similar manner, when NR UL transmission is overlapped with LTE-SL transmission, it can be considered that power is allocated to LTE-SL transmission first considering that LTE-SL transmission can be used to conveying BSM. Furthermore, considering that a UE can transmit both SL and UL in the same CG, it would be complicated to allocate power according to the priority of SL transmission. In this case, it would be possible to reuse the current wording for power control for uplink with dual connectivity. On the other hand, whether or how to support NR-DC for NR sidelink needs to have further investigation especially on the condition for the dynamic power sharing. Considering time budget, it can be considered that only NR-DC with Semi-static-model or Semi-sttatic-mode2is supported for NR sidelink in Rel-16.
Proposal 2: Reuse power control for NE-DC and EN-DC for simultaneous transmission of SL transmission and UL transmission on different carriers.
Proposal 3: In Rel-16 NR sidelink. NR-DC with Semi-static-model or Semi-static-mode2 is supported for NR sidelink.
In RAN1#97 meeting [2], it is agreed that "Total sidelink transmit power is the same in the symbols used for PSCCH/PSSCH transmissions in a slot". In this case, it seems straightforward that the transmit power of PSCCH transmission is derived by the transmit power of the corresponding PSSCH transmission. Meanwhile, since the number of PRBs for PSSCH transmission could be dynamically changed, PSD boosting for PSCCH would make the power control for PSCCH/PSSCH complicated. In those of points of views, it can be considered that the PSD boosting for PSCCH is not supported in NR sidelink. For a PSCCH coverage, it can be considered that the number of symbols and the number of PRBs for PSCCH transmission are (pre)configured to have sufficiently large number considering the payload size of the SCI format 0_1.
Proposal 5: Not support PSD boosting for PSCCH transmission.
Regarding SL-RSRP measurement reporting, it is necessary to specify how TX UE calculates "Reference Signal Power" for SL PL derivation (= Reference Signal Power – L3 filtered SL RSRP received from RX UE). In our view, the same filter coefficient and normalization rule used for SL-RSRP measurement can be applied to transmit power of the RS for SL-RSRP measurement.
Proposal 7: For SL pathloss estimation, TX UE derives Reference Signal Power for pathloss estimation by using the same filter and normalization rule used for a L3-filtered SL-RSRP measurement.
For PSCCH/PSSCH transmission power control, UE can be (pre)configured with a maximum transmit power per CBR range per priority. In this case, it is necessary to define when the CBR range is measured for the PSCCH/PSSCH power control. Meanwhile the processing time for power setting of the PSCCH/PSSCH transmissions will not be changed depending on the subcarrier spacing for NR sidelink. In other words, the time gap between the CBR range measurement and the associated PSCCH/PSSCH transmissions will be given by absolute time manner. In LTE V2X, CBR range to decide maximum configured transmit power for PSCCH/PSSCH transmission in subframe n is measured in n–4. In those points of views, the maximum transmit power for PSCCH/PSSCH in slot i could be determined based on a priority level of the PSSCH transmission and a CBR range that includes a CBR measured in slot i – $N_{slot}^{subframe, \mu} \cdot 4$ where $N_{slot}^{subframe, \mu}$ is the number of slots in a subframe with a SCS configuration $\mu$.
Proposal 8: (Pre)configured maximum transmit power for PSCCH/PSSCH in slot I is determined based on a CBR range that includes a CBR measured in slot i – $N_{slot}^{subframe, \mu} \cdot 4$ where $N_{slot}^{subframe, \mu}$ is the number of slots in a subframe with a SCS configuration $\mu$.
If the PSFCH resource period N is more than one slot, and if only a single PSFCH transmission is allowed in a PSFCH transmission occasion, a UE can drop a number of PSFCH transmissions, and it will cause a number of retransmissions of PSSCH unnecessarily. To mitigate this problem, it is necessary to support more than one PSFCH transmissions in the same PSFCH transmission occasion in Rel-16 NR

TABLE 9 sidelink. In our view, maximum number of PSFCH transmissions in a PSFCH transmission occasion would be a part of UE capability, and it is up to UE implementation how many PSFCH will be transmitted simultaneously in a PSFCH transmission occasion. In RAN1#99 meeting [3], it is agreed that "When UE transmits N PSFCHs simultaneously (if supported), transmit power of each PSFCH is the same". In this case, for power-limited case, the maximum UE transmit power needs to be equally distributed to the multiple PSFCH transmissions.
Proposal 10: Support more than one PSFCH transmissions by a UE in a PSFCH transmission occasion in Rel-16 NR sidelink.
Maximum number of PSFCH transmissions by a UE in a PSFCH transmission occasion is 4.
Whether or not to support multiple PSFCH transmission in a PSFCH transmission occasion is given by UE capability.
1.2. Sidelink HARQ procedure
On the concept of Zone ID, geographical area can be divided into multiple zones, and each zone could be represented by Zone ID. Considering signaling overhead, different zones can have the same Zone ID. In this case, when the distance between different zones with the same Zone ID is too close, TX-RX distance-based HARQ feedback would not work properly. In this case, it can be considered that the interpretation of Zone ID field in SCI can be different according to the choice of Communication range requirement field in SCI. For instance, if the communication range requirement is set to large value, the size of Zone would be large to have large distance between different zones with the same Zone ID.
On the TX-RX distance calculation, it is necessary to define how the RX UE assumes the TX UE's location. For simplicity, it can be considered that the RX UE assumes that the TX UE is located at the nearest position of the nearest zone with the Zone ID indicated by the received SCI from the RX UE for the TX-RX distance calculation.
Proposal 12: Zone size is (pre)configured per Communication range requirement value.
Meanwhile, the zone size needs to be carefully selected considering the distance measurement error based on Zone ID and the minimum distance between difference zones with the same Zone ID. To be specific, if the zone size is too small, the RX UE may not distinguish the zone where the TX UE is located. In this case, the RX UE would transmit SL HARQ feedback on PSFCH unnecessarily even though the actual distance between the TX UE and RX UE is larger than the communication range requirement. On the other hand, if the zone size is too large, the distance measured based on the Zone ID would be inaccurate.
It can also cause that the unintended UE transmits PSFCH.
The minimum value of the communication range requirement field is 50m. In this case, to minimize error of distance measured based on the Zone ID, the size of the zone needs to be much smaller than 50m. In the same time, considering PSCCH coverage, the minimum distance between different zones with the same Zone ID needs to be larger than 1 km. When the bit field size of Zone ID indicator is 12 bits, there will be 64*64 zones with unique Zone ID. In those point of views, for communication range requirement of 50m, it can be considered that the zone size is at least 15m*15. In this case, then the minimum distance between two zones with the same Zone ID will be 960m. When the communication range requirement has the large value, the minimum distance between two zones with the same Zone ID needs to be much larger than the communication range requirement value to perform TX-RX distance-based HARQ feedback efficiently. In this case, since the maximum value of the communication range requirement field is 1000m, the zone size could be 30m*30m. In this case, the minimum distance between two zones with the same Zone ID will be 1.92 km, and the RX UE can decide whether SL HARQ-ACK feedback is transmitted on PSFCH according to the Zone ID indicated by the TX UE.
Proposal 13: For the zone size, support following parameters with the range of values:

TABLE 10 zoneLength = {15 m, 20 m, 25 m, 30 m}
zoneWidth = {15 m, 20 m, 25 m, 30 m}
Proposal 14: For TX-RX distance derivation, RX UE assumes that TX UE's location is the nearest position of the nearest zone with the Zone ID indicated by the received SCI from the TX UE.
TX-RX distance-based HARQ-ACK feedback for NR sidelink is supported only for groupcast with HARQ feedback Option 1. In other words, Zone ID field and Communication range requirement field would not be needed for SCI format scheduling groupcast with HARQ feedback Option 2. In this case, if the SCI format without Zone ID field and Communication range requirement field is supported for the $2^{nd}$-stage SCI format, it would be beneficial to minimize control overhead when PSSCH transmission without the TX-RX distance-based HARQ-ACK feedback operation is scheduled.
Meanwhile, groupcast with HARQ feedback Option 1 could be used without the TX-RX distance-based HARQ-ACK feedback operation. To be specific, a resource pool would not have sufficiently large number of PSFCH resources to support groupcast with HARQ feedback Option 2 to have acceptable PSFCH collision probability. Meanwhile, a UE can be provided by applications such as platooning. Another example is that a PSCCH/PSSCH TX UE may not decide its own location for TX-RX distance-based HARQ-ACK feedback operation. In those cases, it is necessary to support that groupcast with HARQ feedback Option 1 is scheduled by a SCI format without Zone ID field and Communication range requirement field.
Next, in our view, the number of SCI format sizes needs to be minimized considering UE complexity. Since SCI fields for broadcast, unicast, and groupast without the TX-RX distance based HARQ-ACK feedback operation would be the same except for one or two SCI fields, it can be considered that a single $2^{nd}$-stage SCI format can be used to schedule broadcast, unicast, or groupcast without the TX-RX distance based HARQ-ACK feedback operation. In this case, another $2^{nd}$-stage SCI format will be used to schedule groupcast with HARQ feedback Option 1 with the TX-RX distance-based HARQ-ACK feedback operation.
In RAN1#98bis [4], it is agreed that "SCI explicitly indicates whether HARQ feedback is used or not for the corresponding PSSCH transmission" as working assumption. In addition, when a $2^{nd}$-stage SCI format is used to schedule different cast type and HARQ feedback Options, the SCI format also needs to TABLE 10-continued indicate how the PSCCH/PSSCH RX UE transmit SL HARQ feedback of the PSSCH transmission. In our view, it can be considered to support joint indication of whether or how the RX UE transmit SL HARQ feedback.
Proposal 15: Support following two $2^{nd}$-stage SCI formats in Rel-16 NR sidelink:
SCI format 0_2:
It contains HARQ feedback indicator which provide jointly SL HARQ-ACK feedback enabling/disabling and groupcast HARQ feedback option.
It is used to schedule broadcast, unicast, or groupcast with HARQ feedback
Option 1 or Option 2
SCI format 0_3:
It contains Zone ID field and Communication range requirement field
It is only used to schedule groupcast with HARQ feedback Option 1
The selection of the $2^{nd}$-stage SCI format and HARQ feedback option indicator in a SCI format 0_2 will be depending on the feasibility or benefit of groupcast HARQ feedback Option 2. To be specific, when the group size is too large, the amount of PSFCH resource would not be sufficient to support groupcast HARQ feedback Option 2, or it will cause excessively large collision probability among PSFCHs transmitted by different the groupeast RX UEs. Meanwhile, when the group size is sufficiently large, the

TABLE 11

DTX problem and destructive sum effect will be mitigated for groupeast HARQ feedback Option 1. To be specific, the overall probability that all the UEs suffer from DTX problem will be extremely small, and the aggregated RX power will compensate the destructive sum effect. In this case, it would be beneficial to use groupcast HARQ feedback Option 1 rather than groupcast HARQ feedback Option 2 in terms of PSFCH signaling overhead.
Proposal 16: Support UE procedure to select groupcast HARQ feedback Option according to the group size.
For groupcast, if the group size is greater than $R_{PRB,CS}^{PSFCH} + 1$, the TX UE is not expected to select groupcast HARQ feedback Option 2.
$R_{PRB,CS}^{PSFCH} = N_{type}^{PSFCH} \cdot M_{subch,slot}^{PSFCH}$ is a number of PSFCH resoruces available for multiplexing HARQ-ACK information in a PSFCH transmission
where
$M_{subch,slot}^{PSFCH} = M_{PRB,set}^{PSFCH}/(N_{subch} \cdot N_{PSSCH}^{PSFCH})$ where $M_{PRB,set}^{PSFCH}$ is the number of PRBs for PSFCH RB set in a resource pool, $N_{subch}$ is the number of sub-channels in a resource pool, and a number of $N_{PSSCH}^{PSFCH}$ PSSCH slots associated with a PSFCH slot.
$N_{CS}^{PSFCH}$ is a number of cyclic shift pairs for the resource pool
$N_{type}^{PSFCH} = N_{subch}^{PSSCH}$ and the $N_{subch}^{PSSCH} \cdot M_{subch,lot}^{PSFCH}$ are located in one or more sub-channels from the $N_{subch}^{PSSCH}$ sub-channels
In RAN1#99 meeting [3], it is agreed that "The number of cyclic shift pairs used for a PSFCH transmission (denoted by Y) that can be multiplexed in a PRB is (pre-)configured per resource pool among {1, 2, 3, 4, 6}". Remaining issues is the exact values of cyclic shifts use for a PSFCH transmission. In our view, for a given number of cyclic shift pairs for a PSFCH transmission, it would be beneficial to maximize the distance between different cyclic shifts considering target delay spread value.
Proposal 17: Support cyclic shift values for a given number of cyclic shift pairs used for a PSFCH transmission that can be multiplexed in a PRB
When the number of m_0 values is 1,
{0, 6}
When the number of m_0 values is 2,
{0, 6}, {3, 9}
When the number of m_0 values is 3,
{0, 6}, {2, 8}, {4, 10}
When the number of m_0 values is 4,
{0, 6}, {2, 8}, {4, 10}, {5, 11}
When the number of m_0 values is 6,
{0, 6}, {1, 7}, {2, 8}, {3, 9}, {4, 10}, {5, 11}
Regarding groupcast with HARQ feedback Option 1, the PSSCH RX UE will transit NACK on PSFCH if the UE fails to decode PSSCH, and transmit nothing if the UE successes to decode PSSCH. In this case, it is necessary that such a UE behavior is described in the specification.
For groupcast with HARQ feedback Option 2, depending on the number of RX UEs, the PSFCH collision probability would be large. To mitigate this problem, it can be considered that the candidate PSFCH resource is the set of PRBs associated with the sub-channel(s) and slot used for that PSSCH. In this case, a large number of RX UE could be supported by PSSCH transmission with a large number PRB allocation.
Proposal 18: For a PSSCH, the candidate PSFCH resource is the set of PRBs associated with the sub-

TABLE 12 channel(s) and slot used for that PSSCH.
According to the UE procedure related to PSSCH, there are two aspects: one is the UE procedure for transmitting PSSCH, and the other is the UE procedure for receiving PSSCH. On the other hand, in the latest version of the NR specification, it seems that the UE procedure
for receiving PSFCH or HARQ-ACK on sidelink is missing.
Furthermore, the current MAC running CR assumes that MAC will define the UE
behavior such as commencing retransmission based on the SL HARQ status reported from PHY. In those TABLE 12-continued of point of views, it is necessary to capture UE procedure where the UE report received HARQ-ACK
feedback on PSFCH to MAC layer. Meanwhile, the groupcast HARQ feedback Option will not be seen in
the MAC layer. In other words, for groupcast HARQ feedback Option 1, the TX UE needs to report ACK
to MAC layer when the UE does not receive the expected PSFCH.
Proposal 21: Capture UE procedure for receiving HARQ-ACK on sidelink in TS 38.213 (including
HARQ reporting mode):
UE can determine the HARQ reporting mode based on the $2^{nd}$-stage SCI format and/or HARQ
feedback indicator in the $2^{nd}$-stage SCI.
When the TX UE determines HARQ reporting mode A (ACK/NACK transmission),
The UE generates ACK when the UE determines ACK from expected PSFCH
reception(s) in the PSFCH reception occasion; otherwise, generate NACK if the
UE determines absence of PSFCH reception or determines a NACK value from
expected PSFCH reception(s) at a corresponding PSFCH reception occasion.
When the TX UE determines HARQ reporting mode B (NACK-only transmission),
The UE generates ACK when the UE determines absence of PSFCH reception
for each PSFCH reception occasion from the number of PSFCH reception
occasions; otherwise, generate NACK.
The HARQ-ACK information by the TX UE will be reported to MAC layer.
If simultaneous transmissions of multiple PSFCHs is supported, it is necessary to define how to
handle the combination(s) of Case 1, Case 2, and/or Case 3. To be specific, for a given slot,
a UE may need to transmit more than one PSFCHs, and the UE may need to
receive more than one PSFCHs in the same time. In addition, these PSFCH transmissions
and receptions could have different priority. For simplicity,
it can be considered that a UE decide first whether to perform PSFCH TX or PSFCH RX by
comparing the smallest priority value of PSFCH TXs with the smallest priority value of PSFCH RXs.
Then, if PSFCH TX is prioritized over PSFCH RX, the UE can transmit multiple
PSFCHs if more than one PSFCH transmissions is supported.
Proposal 23: If more than one PSFCH transmissions is supported in Rel-16 NR sidelink, the following
steps are used for handling combination of Case 1, Case 2, and Case 3,
Step 1: Decide first between PSFCH TX and PSFCH RX by comparing the smallest priority
value of PSFCH TXs with the smallest priority value of PSFCH RXs.
Step 2-1: If the smallest priority of PSFCH TXs is smaller than the smallest priority of PSFCH
RXs, the UE performs all the PSFCH TXs.
Step 2-2: Otherwise, the UE performs all the PSFCH RXs.
Sidelink CSI measurement/reporting procedure
In email discussion [99-NR-03] [5], following is agreed:
Agreements:

TABLE 13

Latency bound for Sidelink CSI Reporting MAC CE is configurable within a range of 3 – 20 ms,
expressed in slots, where RAN1 will decide how the value is configured in the next meeting.
In Rel-16 NR sidelink, sidelink CSI reporting is supported only for unicast. In other words, sidelink CSI
measurement and reporting will be performed after PC5-RRC connection between a TX UE and a RX UE.
The latency bound for sidelnk CSI reporting needs to consider the processing time for CSI measurement,
calculation, and preparation of the MAC CE for sidelink CSI reporting at the RX UE side. In addition, the
latency bound for the sidelink CSI reporting would be changed depending on the service type or application
or TX UE-RX UE channel environment. For instance, the relative speed between a TX UE and a RX UE is
high, the time difference between sideilnk CSI-RS transmission and sidelink CSI reporting reception at the
TX UE side needs to be minimized to select MCS efficiently. In those points of views, to decode latency
bound for the sidelink CSI reporting MAC CE, the TX UE and RX UE need to negotiate each other. In
other words, the latency bound for sidelink CSI reporting MAC CE could be PC5-RRC configured.
Meanwhile, the packet delay budget for sidelink CSI reporting MAC CE could limit the resource
selection window size. If the packet delay budget is too small, and if the resource selection window size is
too small, the number of resources for resource (re)selection would not be sufficiently large to have
acceptable interference level. In this case, it can be considered that allowable latency bound for sidelink
CSI reporting MAC CE is (pre)configured in a resource pool for resource efficiency in the network
perspective.
Proposal 24: Latency bound for Sidelink CSI Reporting MAC CE is configured by PC5-RRC signaling.
In Rel-16 NR sidelink, sidelnk CSI-RS transmission is confined within the PSSCH transmission
scheduled by SCI indicating CSI request. In other words, a UE will transmit sidelink CSI-RS only if the
SCI transmitted by the UE triggers sidelink CSI reporting. In this case, it is natural that the timing of CSI
reference resource of a sidelink CSI reporting is the same slot where the corresponding CSI request is
transmitted.
Proposal 25: For sidelink CSI reporting, the associated CSI reference resource is the resources used for
PSSCH scheduled by SCI triggering the sidelink CSI reporting.
Next, to derive CQI and RI efficiently, it is necessary to define the reference form of the PSSCH
transmission. Unlike NR Uu link, the PSCCH overhead would not be changed in a resource pool. In this
case, the actual overhead for PSCCH can be considered for the sidelink CSI reference resource. Next, in
case of PSSCH symbol duration could be dynamically changed depending on the existence of PSFCH
resources in a slot. If the TX UE and the RX UE have different understanding on the PSSCH symbol
duration, MCS/# of layer selection based on reported CQI/RI would be inaccurate.
For sidelink CQI/RI calculation, it can be considered that the PSSCH is transmitted in non-PSFCH
slot. In a similar manner, PSSCH DMRS pattern also needs to be fixed for CQI/RI calculation. In our view,
to express peak data rate, the number of PSSCH DMRS symbols is the minimum value among the higher
layer configured values. Next, the actual $2^{nd}$-stage SCI overhead could be dynamically changed depending
on the number of PRBs for PSSCH transmission, beta offset indicated by the $1^{st}$-stage SCI, and $2^{nd}$-stage

TABLE 13-continued

SCI format indicated by the $1^{st}$-stage SCI. In this case, it is preferred that no $2^{nd}$-stage SCI overhead is
assumed for sidelink CQI/RI calculation or the overhead is expressed in terms of the number of symbols.
When the TX UE receives sidelink CSI reporting from the RX UE, the TX UE needs to compensate
CQI/RI values considering the actual overhead of the $2^{nd}$-stage SCI.
Proposal 26: For sideilnk CQI/RI calculation, in the CSI reference resource, the UE assumes the

TABLE 14 following:
PSCCH occupies timeResourcePSCCH OFDM symbols and frequencyResourcePSCCH PRBs
in the resource pool
The number of PSSCH symbols is equal to lengthSLsymbols − 2
The same bandwidth part subcarrier spacing and CP length configured as for the PSSCH
reception
Assume the same bandwidth as allocated for the PSSCH reception
Redundancy Version 0
Assume no REs allocated for sidelink CSI-RS
Assume no REs allocated SCI format 0_2 or SCI format 0_3
Assume the same number of DMRS symbols as the minimum symbols configured by the higher
layer parameter TimePatternPsschDmrs
The PSSCH transmission scheme where the UE may assume that PSSCH transmission would
be performed with up to 2 transmission layers
the UE should assume that PSSCH signals on antenna ports in the set [1000, . . . , 1000 + v − 1]
for v layers would result in signals equivalent to corresponding symbols transmitted on
antenna ports [3000, . . . , 3000 + P − 1]
P∈[1, 2] is the number of CSI-RS ports
Precoding matrix is the identity matrix In the above description, the term "configuration" may be interpreted to be configured (e.g., SIB or RRC signaling)/pre-configured by a BS/network or may also be interpreted through predefined signaling (e.g., PC5 RRC) between UEs. In addition, the "configuration" may be interpreted to be configured (e.g., SIB or RRC signaling)/PRE-configured or to be activated/deactivated via dynamic signaling.

In this case, for example, (the aforementioned) SL BWP and Uu BWP-related information of the UE (and/or information on whether to apply a proposed rule) may be differently (or independently) configured (by a network/BS) specifically for a resource pool (and/or a service type/priority, a (service) QOS parameter (e.g., reliability and latency), an (absolute or relative) speed of a UE, a UE type, a subchannel size, and/or a size of scheduled frequency resource region), or may be implicitly determined based on a preconfigured parameter (e.g., a frequency resource size).

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
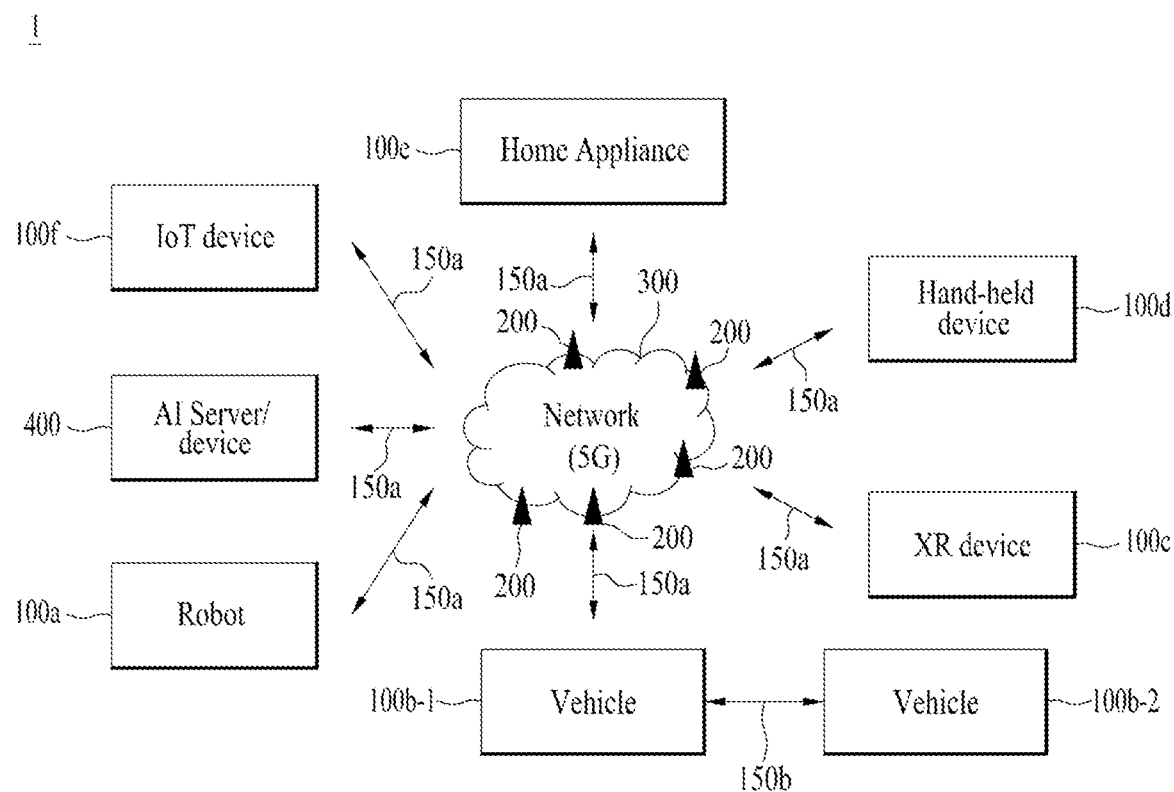
FIGS. 12 to 18 are diagrams for explaining various apparatuses to which embodiment(s) is applicable.

FIG. 12 illustrates a communication system 1 applied to the present disclosure.

Referring to FIG. 12, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 13:
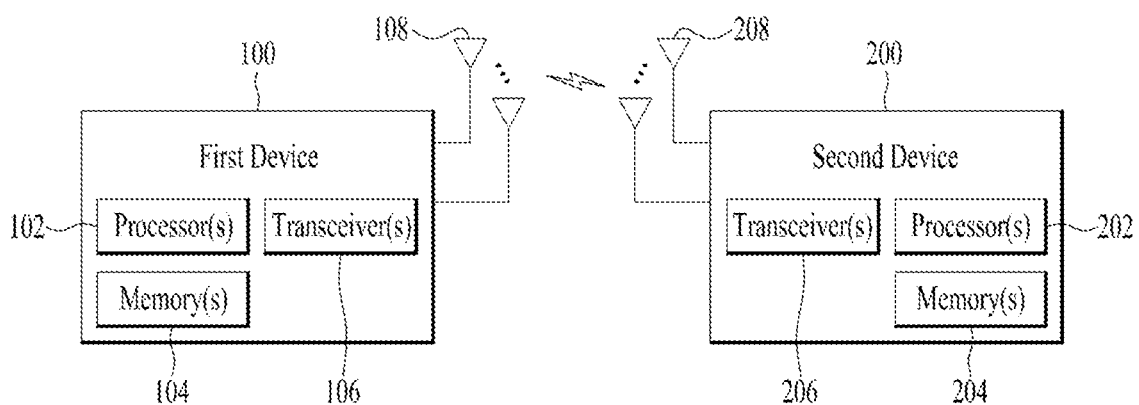

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
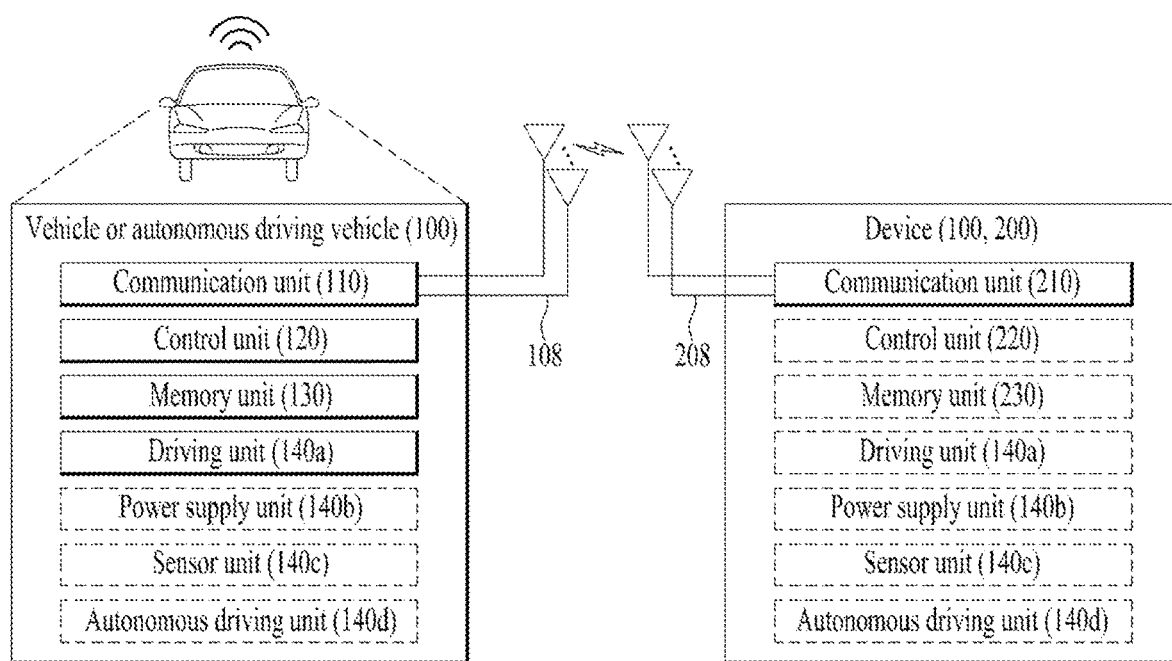

Examples of a Vehicle or an Autonomous Driving Vehicle Applicable to the Present Disclosure FIG. 14 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 14, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 15:
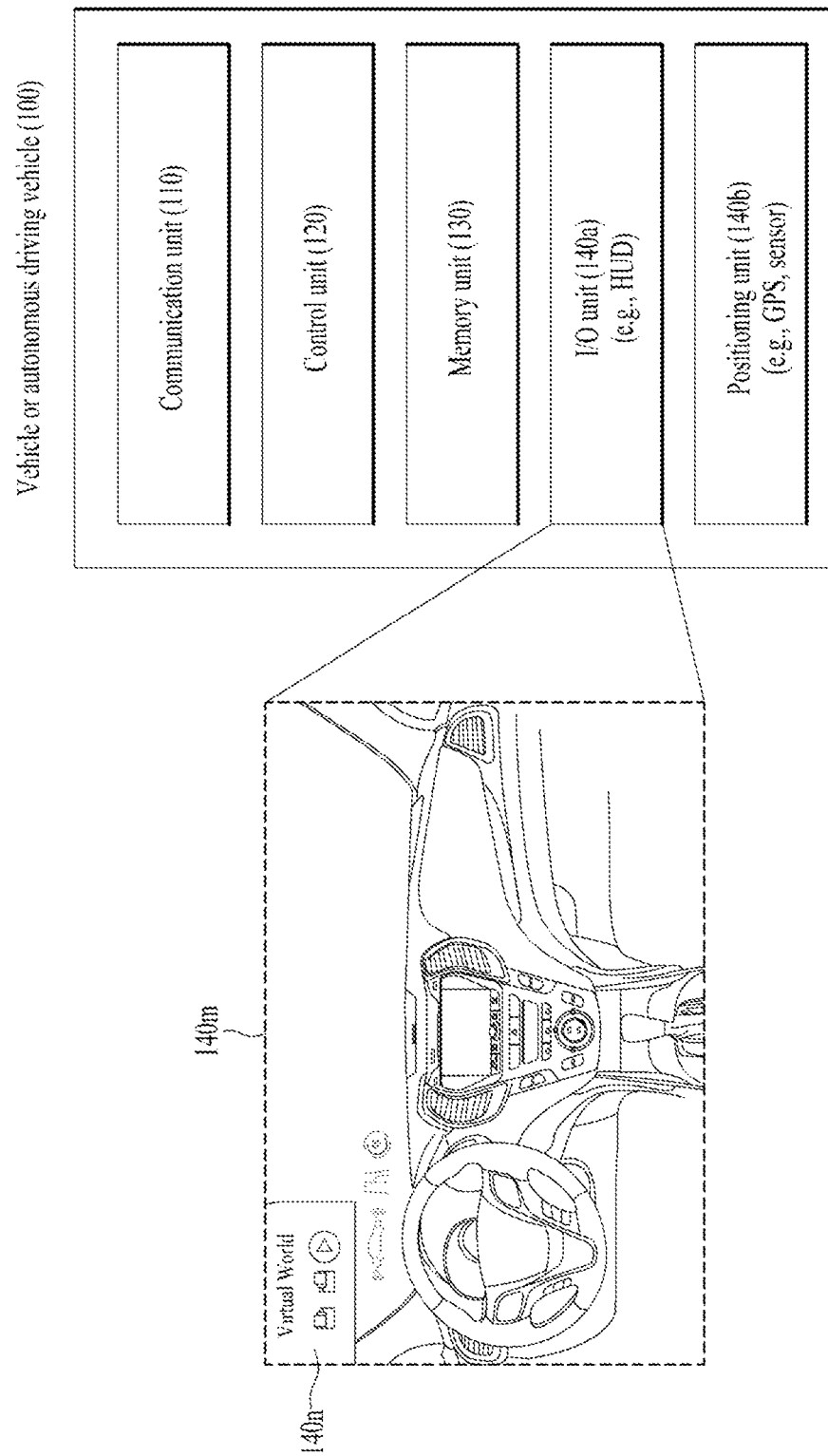

FIG. 15 illustrates a vehicle applied to the present disclosure. The vehicle may be implemented as a transport means, an aerial vehicle, a ship, etc.

Referring to FIG. 15, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 16:
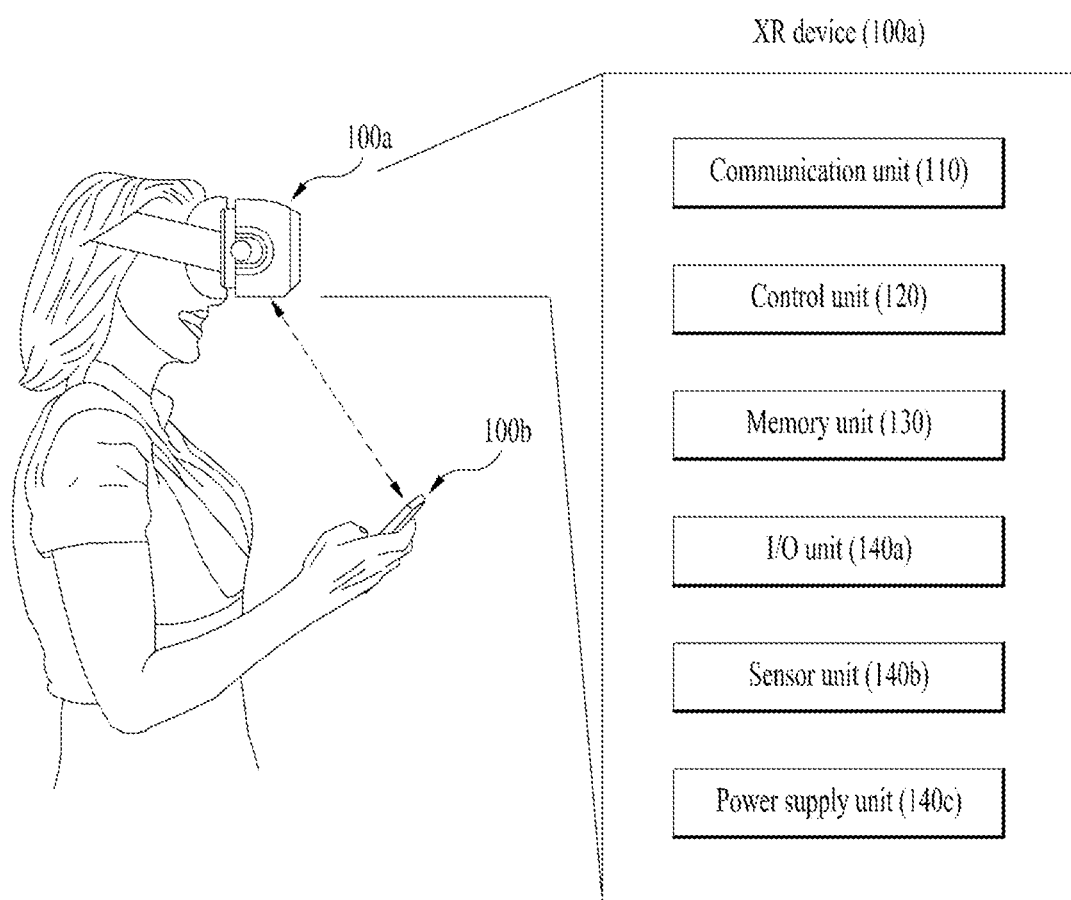

FIG. 16 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 16, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 17:
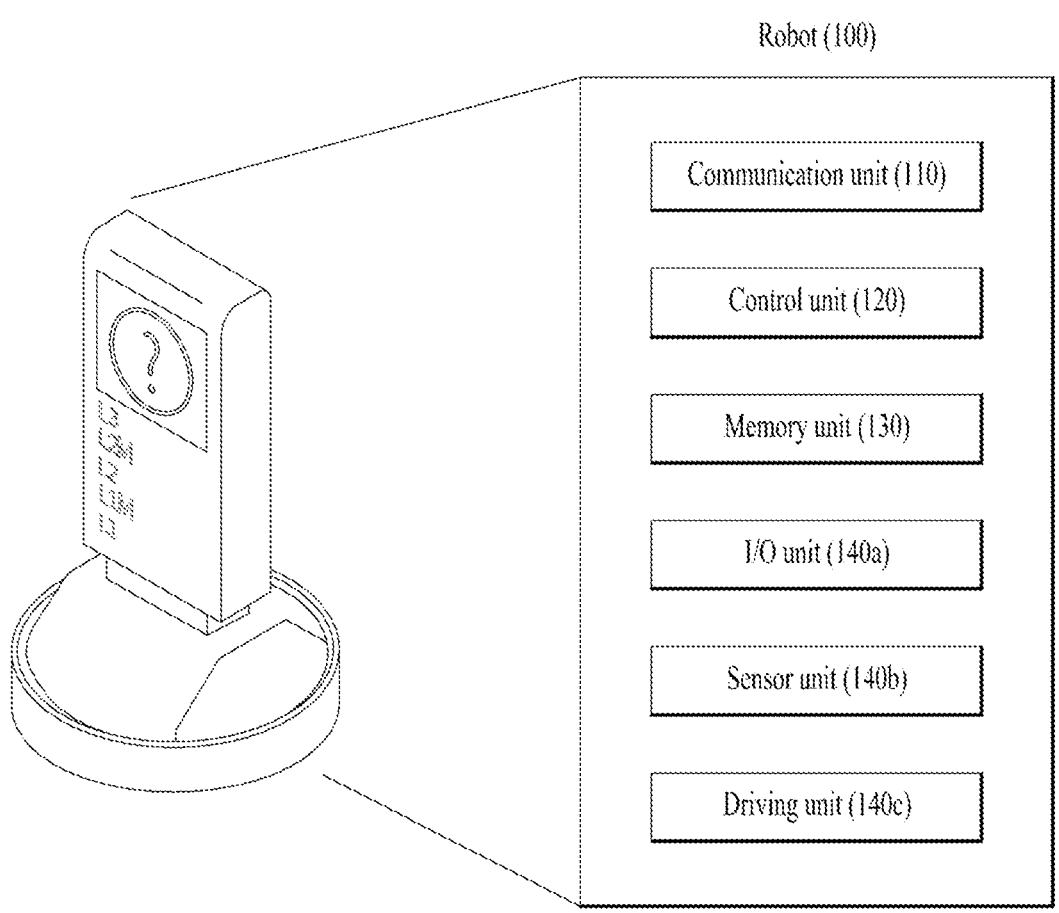

FIG. 17 illustrates a robot applied to the present disclosure. The robot may be categorized into an industrial robot, a medical robot, a household robot, a military robot, etc., according to a used purpose or field.

Referring to FIG. 17, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 13, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI Device to which the Present Disclosure is Applied

Figure 18:
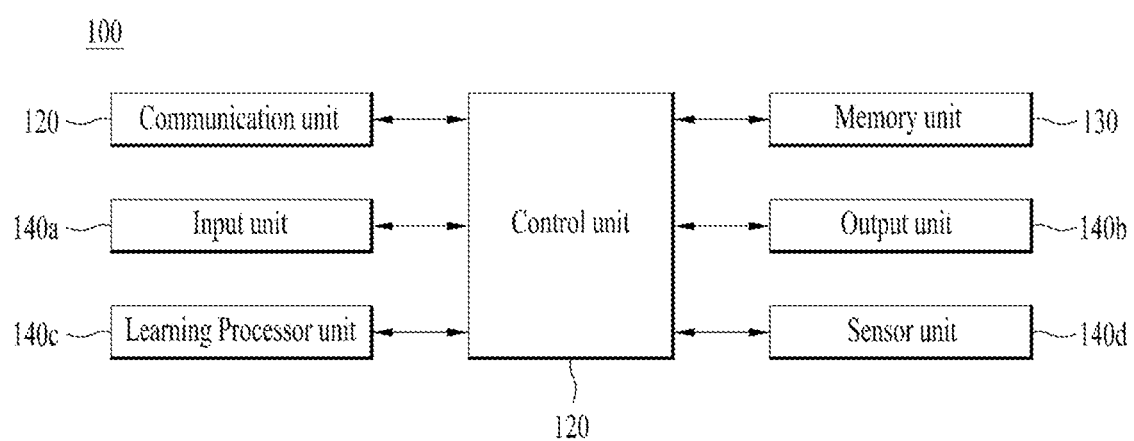

FIG. 18 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 18, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 13, respectively.

The communication unit 110 may transmit and receive wired/radio signals (e.g., sensor information, user input, learning models, or control signals) to and from external devices such as other AI devices (e.g., 100x, 200, or 400 of FIG. 12) or an AI server (e.g., 400 of FIG. 12) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 12). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 12). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The above-described embodiments of the present disclosure are applicable to various mobile communication systems.

What is claimed is:

1. A method performed by a first user equipment (UE) in a wireless communication system, the method comprising:
receiving a configuration for a sidelink resource pool including additional modulation coding scheme (MCS) table information;
transmitting, to a second UE, a message including sidelink UE capability information including MCS table information supported by the first UE;
receiving, from the second UE, information including additional MCS table indicator information;
transmitting channel status information (CSI) including channel quality information (CQI),
wherein a MCS table is determined, based on the additional MCS table indicator information, from among MCS tables including a QAM256 table configured through the additional MCS table information in the configuration for the sidelink resource pool, and wherein, based on the QAM256 table being determined as the MCS table, the CQI is derived based on CQI information including QAM256-related values.

2. The method of claim 1, further comprising:
receiving a channel status information reference signal (CSI-RS) within a physical sidelink shared channel (PSSCH); and
deriving the CSI based on the CSI-RS.

3. The method of claim 1, wherein the CSI includes a rank indicator (RI).

4. The method of claim 1, wherein the configuration for the sidelink resource pool is received through higher layer signaling from a base station (BS).

5. The method of claim 1, wherein the additional MCS table information in the configuration for the sidelink resource pool further includes a low-spectral efficiency QAM64 table.

6. The method of claim 1, wherein the message including the sidelink UE capability information is transmitted through higher layer signaling.

7. The method of claim 1, wherein the information including the additional MCS table indicator information is related to sidelink control information (SCI).

8. The method of claim 1, wherein, when one or more sidelink transmissions including transmission of the CSI overlaps with a plurality of uplink (UL) transmissions, only if at least one sidelink transmission takes precedence over all the plurality of UL transmissions, sidelink transmission is performed.

9. The method of claim 1, wherein the first UE deactivates a sidelink bandwidth part (BWP) of which at least one of a resource block (RB) boundary with an uplink BWP or a direct current (DC) location is not aligned.

10. A non-transitory computer readable medium storing instructions, when executed by a processor, that cause the processor to perform operations for a first user equipment (UE), the operations for the first UE comprising:
receiving a configuration for a sidelink resource pool including additional modulation coding scheme (MCS) table information;
transmitting, to a second UE, a message including sidelink UE capability information including MCS table information supported by the first UE;
receiving, from the second UE, information including additional MCS table indicator information;
transmitting channel status information (CSI) including channel quality information (CQI),
wherein a MCS table is determined, based on the additional MCS table indicator information, from among MCS tables including a QAM256 table configured through the additional MCS table information in the configuration for the sidelink resource pool, and
wherein, based on the QAM256 table being determined as the MCS table, the CQI is derived based on CQI information including QAM256-related values.

11. A device for wireless communication, the device comprising:
a memory configured to store instructions; and
a processor configured to perform operations by executing the instructions, the operations comprising:
receiving a configuration for a sidelink resource pool including additional modulation coding scheme (MCS) table information;
transmitting, to another device, a message including sidelink device capability information including MCS table information supported by the device;
receiving, from the another device, information including additional MCS table indicator information;
transmitting channel status information (CSI) including channel quality information (CQI),
wherein a MCS table is determined, based on the additional MCS table indicator information, from among MCS tables including a QAM256 table configured through the additional MCS table information in the configuration for the sidelink resource pool, and
wherein, based on the QAM256 table being determined as the MCS table, the CQI is derived based on CQI information including QAM256-related values.

12. The device of claim 11, further comprising:
a transceiver configured to transmit or receive a wireless signal under control of the processor.

13. The device of claim 11, wherein the device is a user equipment (UE) configured to operate in a wireless communication system.

14. The device of claim 11, wherein the operations further comprising:
receiving a channel status information reference signal (CSI-RS) within a physical sidelink shared channel (PSSCH); and
deriving the CSI based on the CSI-RS.

15. The device of claim 11, wherein the CSI includes a rank indicator (RI).

16. The device of claim 11, wherein the configuration for the sidelink resource pool is received through higher layer signaling from a base station (BS).

17. The device of claim 11, wherein the additional MCS table information in the configuration for the sidelink resource pool further includes a low-spectral efficiency QAM64 table.

* * * * *